(12) United States Patent
Simovich et al.

(10) Patent No.: US 6,308,241 B1
(45) Date of Patent: *Oct. 23, 2001

(54) ON-CHIP CACHE FILE REGISTER FOR MINIMIZING CPU IDLE CYCLES DURING CACHE REFILLS

(75) Inventors: Slobodan Simovich, Sunnyvale; Brad E. Eltman, Saratoga, both of CA (US)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,820

(22) Filed: Dec. 22, 1997

(51) Int. Cl.⁷ .............. G06F 12/00; G06F 3/00; G06F 15/00; G06F 9/00
(52) U.S. Cl. .............. 711/118; 711/123; 711/3; 712/1; 712/220; 710/52; 710/53
(58) Field of Search .............. 711/3, 118, 123; 710/52, 53; 712/1, 220

(56) References Cited

U.S. PATENT DOCUMENTS

| | | | |
|---|---|---|---|
| 5,179,679 | * | 1/1993 | Shoemaker .............. 395/425 |
| 5,353,426 | | 10/1994 | Patel et al. .............. 395/425 |
| 5,386,526 | * | 1/1995 | Mitra et al. .............. 395/400 |
| 5,671,444 | * | 9/1997 | Akkary et al. .............. 395/872 |
| 5,752,263 | * | 5/1998 | Kranich .............. 711/137 |
| 5,765,190 | * | 6/1998 | Circello et al. .............. 711/118 |
| 5,854,914 | * | 12/1998 | Bodas et al. .............. 395/392 |

FOREIGN PATENT DOCUMENTS

0543487A1    5/1993   (EP) .............. G06F/12/08

OTHER PUBLICATIONS

"MIPS RISC Architecture", Gerry Kane and Joe Heinrich, Prentice Hall, 1992, chapter 5.

"Structured Computer Organization", A.S. Tanenbaum, Prentice Hall International Editions, thi 1990, pp.472–487.

"MIPS RISC Architecture", Gerry Kane and Joe Heinrich, Prentice Hall, 1992, chapter 1.

* cited by examiner

Primary Examiner—Do Hyun Yoo
Assistant Examiner—Kimberly McLean
(74) Attorney, Agent, or Firm—Peter Verdonk

(57) ABSTRACT

A CPU has an execution unit for operating on data under instruction control. A cache and a buffer register are coupled in parallel to an input of the execution unit. The buffer register supplies an information item, such as data or an instruction, to the execution unit upon the cache having completed a refill process.

6 Claims, 1 Drawing Sheet

ON-CHIP CACHE FILE REGISTER FOR MINIMIZING CPU IDLE CYCLES DURING CACHE REFILLS

FIELD OF THE INVENTION

The invention relates to an electronic circuit comprising a CPU with a cache. The invention also relates to a method of supplying an information item, such as data or an instruction, to an execution unit of a CPU.

BACKGROUND ART

A CPU typically has one or more cache memories arranged between the data and instruction inputs of its execution unit on the one hand and the port for connection to main memory. The caches compensate for the difference in speed between the processing in the CPU and the fetching of data and instructions from main memory. The successful operation of the cache relies on the locality principle: program references to memory tend to be clustered in time and in logical space. Temporal clustering relates to the tendency to reference the same address more than once within a specific period of time. Spatial clustering relates to the tendency to fetch data or instructions from logically consecutive memory addresses. The data and instructions in the main memory are mapped into the cache in blocks of logically coherent addresses. Below, the term "information item" is used to refer to either data or an instruction within this context.

A cache read miss occurs when the CPU requests an information item that is not present in its cache. The cache has thereupon to retrieve the appropriate block from the main memory or the secondary cache and store it. During this cache refill, the execution unit is stalled. Various techniques are in use to minimize the number of clock cycles that the execution unit has to idle as a result of a cache refill.

For example, European patent application 0 543 487 A1 discusses the early-restart technique. As soon as the requested item arrives from main memory it is sent to the execution unit without waiting for completion of the writing of the entire block to the cache. A refinement of this early-restart is the out-of-order fetch. The out-of-order fetch lets the main memory skip all information items located at addresses logically preceding the requested item in the relevant block. The requested item is sent directly to the execution unit upon retrieval while the remainder of the block is being retrieved looping around to fetch the items previously skipped.

European patent application 0 543 487 A1 also discusses an alternative technique that involves the following steps. If the CPU fetches data during a data cache fill and the requested data being fetched is part of the memory block being currently filled, the data is retrieved and returned to the execution unit simultaneously with its writing into the cache, if the data has not been written into the cache. If the data has been written into the cache, the data is retrieved and returned to the execution unit at the next read cycle.

Also see, e.g., "MIPS RISC Architecture", Gerry Kane and Joe Heinrich, Prentice Hall, 1992, notably Chapter 5, page 5-5. In the implementations of MIPS processor architectures, e.g., the R2000 and R3000, a typical sequence of events occurring after a cache miss are the following. On a cache miss, the processor reads one word from memory and stalls while the designated blocks in the cache are refilled. After the refill has been completed, missed information items are retrieved from the cache and are supplied to the processor's execution unit to resume processing. For general background information on the MIPS architecture, also see, e.g., "Structured Computer Organization", A. S. Tanenbaum, Prentice Hall International Editions, third edition, 1990, especially pp. 472–487.

OBJECT OF THE INVENTION

The advantages of early restart are limited if the execution unit processes the requested item faster than the cache can complete the refill. In the latter case, the execution has to idle after processing the item that was received directly until the cache has been refilled.

The alternative technique in the prior art reference discussed above addresses the problem of reducing the number of idle cycles of the execution unit while the cache is being refilled. This prior art reference does not address the problem of reducing the number of idle cycles when the refill has been, or nearly has been, completed. It is an object of the invention to increase performance of the processor by reducing the number of idle cycles substantially near completion of the cache refill.

SUMMARY OF THE INVENTION

To this end, the invention provides an electronic circuit comprising a CPU, an input for receipt of an information item, and a cache between the input and an execution unit of the CPU. The execution unit is operative to process the item. The circuit further comprises a buffer between the input and the execution unit, and a controller connected to the buffer. The controller controls the storing of the information item in the buffer and the supply of the item to the execution unit substantially near completion of a cache refill.

The inventor proposes to use a temporary buffer in order to prevent the CPU from idling at least during the step wherein an item is being retrieved from the cache upon completion of the refill. The item is provided from the buffer instead of from the cache near completion of the refill. In this way, at least one clock cycle is saved per cache miss, since the buffer register is not address-controlled like a cache.

The circuit of the invention can use the buffer in combination with a main memory capable of early-restart and out-of-order fetch as mentioned above. The early restart/out-of-order fetch allows reducing the number of CPU idling cycles preceding the cache refill, and the buffer register in the invention reduces the number of CPU idling cycles after the cache has been refilled or has nearly completed refilling.

BRIEF DESCRIPTION OF THE DRAWINGS

The invention is explained below in further detail and by way of example with reference to the accompanying drawings, wherein.

PREFERRED EMBODIMENTS

Figure 1:
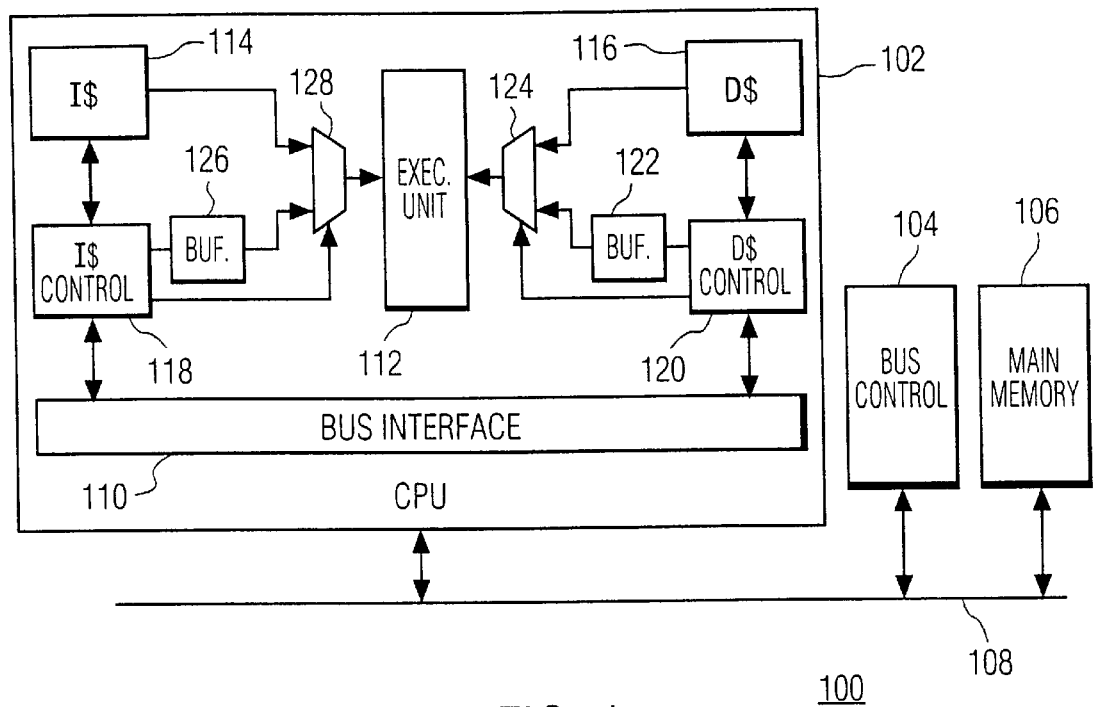
FIG. 1 is a block diagram of a circuit of the invention.

FIG. 1 is a functional block diagram with main components of an electronic circuit 100 according to the invention. Circuit 100 comprises a CPU 102, a bus controller 104 and a main memory 106 interconnected via a bus 108. CPU 102 has a bus interface 110, an execution unit 112, an instruction cache 114, a data cache 116, an instruction cache controller 118 and a data cache controller 120 for control of caches 114 and 116, respectively. CPU 102 further comprises a buffer register 122. In this example, buffer 122 and data cache 116 are arranged in parallel between controller 120 and unit 112. Buffer 122 and cache 116 are coupled to a data input of unit 112 via a multiplexer 124 that is controlled by controller 120.

Controller 120 controls buffer 122 to store data so that it can be supplied to execution unit 112 substantially at or near completion of a refill of cache 110 upon a read miss. In this manner, at least one clock cycle is saved during which unit 112 needs not idle. Buffer 122 supplies one or more data items to unit 112, e.g., when cache 116 is preparing for the first read cycle after the refill. The cache read cycle and the supply via buffer register 122 thus overlap in time.

Buffer 122 stores at least the data that was requested by CPU 102 and that caused the cache read miss. Buffer 122 may also store further data items at the addresses logically successive to the address of the requested data. Cache 116 also stores the requested data and the logically next data in order to comply with the cache's locality principle mentioned above.

The instruction path between cache 114 and unit 112 contains a similar buffer 126 and multiplexer 128 arrangement as the data path between cache 116 and unit 112 and it is controlled by instruction cache controller 118 in a similar way. Typically, the sequence of instructions during processing is known in advance. Conditional branching operations may occur in some software applications, but between two branching instructions the instruction stream is linear and known. If the buffer is a FIFO and stores two or more instructions, the supply of sequential instructions to unit 112 could start from buffer 126 before completion of the instruction cache refill and the start of the cache read cycle, or even substantially well before the completion of the instruction cache refill. To this end, controller 118 has to keep track of extent to which the address block has been mapped from main memory 106 to cache 114.

Figure 2:
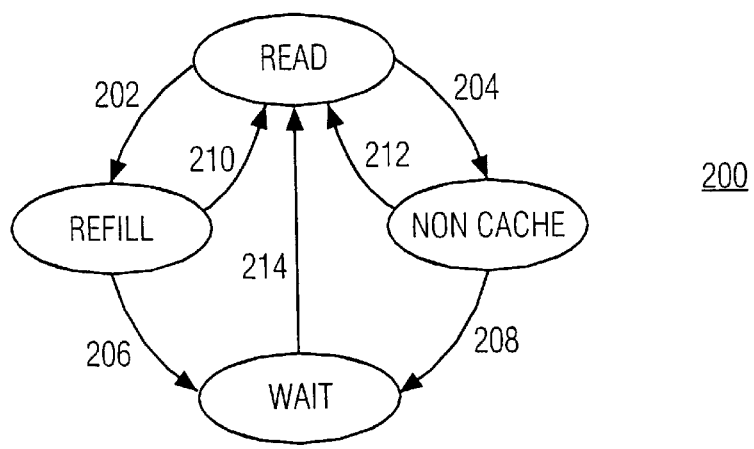
FIG. 2 is a diagram illustrating part of a cache controller's finite state machine.

FIG. 2 is a diagram of a part of a finite state machine 200 in cache controller 120. State machine 200 is explained in the following.

A stall cycle in a pipelines processor such as the MIPS 3000 is a cycle wherein the CPU waits for some event without doing useful work. For background information on the pipeline in the MIPS 3000, see, e.g., "MIPS RISC Architecture", Gerry Kane and Joe Heinrich, Prentice Hall, 1992, especially Chapter 1. The invention reduces the number of stall cycles upon a cache miss. In the MIPS 3000 the sequence of events upon a cache miss is the following. First, the designated blocks in the cache are refilled. Then, after the refill is completed, missed data is read from the cache and supplied to the execution unit. During both the refill phase and the cache read phase, the execution units is stalled. In the invention, however, execution unit 112 is not stalled during the cache read phase. Read data is stored temporarily in buffer 122 during the refill and is supplied to execution unit from buffer 122 and not from cache 116. In this manner at least one clock cycle is saved per individual cache miss. This is illustrated by state machine 200 that comprises the following transitions. Transition 202 from "read"to "refill" corresponds to a cache miss. Transition 204 from "read" to "non-cache" corresponds to a non-cacheable access to main memory (or secondary cache) 106. Transition 206 between "refill" and "wait" corresponds to the refill being completed and the execution unit not being ready yet. Transition 4 between "non-cache" and "wait" corresponds to a non-cacheable word being fetched from main memory 106, and execution unit 112 not being ready yet to accept it. Transition 210 between "refill" and "read" corresponds to the refill being completed and execution unit 112 being ready. Transition 212 between "non-cache" and "read" corresponds to a non-cacheable word being fetched from main memory and execution unit 112 being ready. Transition 214 between "wait" and "read" corresponds to execution unit 112 being ready to accept the data. During the "refill"and "non-cache" states CPU 102 places the requested data in buffer 122 and communicates the data to execution unit 112 during transitions 210, 212 and 214.

We claim:

1. An electronic circuit for reducing the number of idle CPU cycles resulting from a cache read miss to a specified address for a desired information item, comprising a CPU having:
   an input for receipt from memory of the desired information item corresponding to the specified address;
   an execution unit for processing the desired information item;
   an address-controlled cache between the input and the execution unit for storing the desired information item in association with its address;
   a register that is not address-controlled between the input and the execution unit for temporarily storing the desired information item without its address only while the desired information is refilling into said cache; and
   a register controller connected to the register for storing the desired information item in the register and for supplying the desired information item to the execution unit from the register only during said refilling into said cache in order thereby to reduce the number of idle CPU cycles resulting from the cache read miss.

2. The circuit of claim 1, wherein the buffer controller comprises a cache controller.

3. The circuit of claim 1, wherein the cache comprises a data cache.

4. The circuit of claim 1, wherein the cache comprises an instruction cache.

5. An electronic circuit for reducing the number of idle CPU cycles resulting from a cache read miss to a specified address for a desired information item, comprising a CPU having:
   a data input for receipt of data;
   an instruction input for receipt of instructions;
   an execution unit for processing the data under control of the instructions;
   an address-controlled data cache between the data input and the execution unit for storing the data in association with addresses of the data;
   a data register that is not address-controlled between the data input and the execution unit for temporarily storing a datum received in response to a data cache read miss without also storing the address of the datum in the data register and only while said received datum is refilling into said data cache;
   a data register controller connected to the data register for storing the datum in the data register and for supplying the datum to the execution unit from the data register only during said refilling into said data cache in order thereby to reduce the number of idle CPU cycles resulting from the data cache read miss;
   an address-controlled instruction cache between the instruction input and the execution unit for storing the instructions in association with addresses of the instructions;
   an instruction register that is not address-controlled between the instruction input and the execution unit for temporarily storing an instruction received in response to an instruction cache read miss without also storing an address of the received instruction in the instruction register and only while said received instruction is refilling into said instruction cache; and
   an instruction register controller connected to the instruction register for storing the received instruction in the instruction register and for supplying the received instruction to the execution unit from the instruction register only during said refilling into said instruction cache in order thereby to reduce the number of idle CPU cycles resulting from the instruction cache read miss.

6. A method of information processing with an electronic circuit for reducing the number of idle CPU cycles resulting from a cache read miss, the electronic circuit having an address-controlled cache and an execution unit for processing a desired information item that read misses in the cache, the method comprising the steps of temporarily storing the desired information item in a register that is not address-controlled only during cache refill processing of the desired information item without also storing an address of the desired information item in the register and supplying the desired information item to the execution unit from the resister only during said cache refill processing in order to reduce the number of idle CPU cycles thereby.

* * * * *